United States Patent [19]

Battle

[11] 4,212,356
[45] Jul. 15, 1980

[54] NAIL-LESS HORSESHOE

[76] Inventor: Jno R. Battle, 337 Mt. Holyoke Ave., Pacific Palisades, Calif. 90272

[21] Appl. No.: 972,917

[22] Filed: Dec. 26, 1978

[51] Int. Cl.² .............................. A01L 3/00; A01L 3/06
[52] U.S. Cl. ......................................................... 168/18
[58] Field of Search ........................ 168/18, 4, 1, 2, 3, 168/26, 28

[56] References Cited

U.S. PATENT DOCUMENTS

| 164,174 | 6/1875 | Jacobs | 168/18 |
| 759,636 | 5/1904 | Ryan | 168/18 X |
| 797,895 | 8/1905 | Johnson | 168/18 |

FOREIGN PATENT DOCUMENTS

| 683409 | 6/1930 | France | 168/18 |
| 963091 | 6/1950 | France | 168/18 |

Primary Examiner—Hugh R. Chamblee
Attorney, Agent, or Firm—Ralph B. Pastoriza

[57] ABSTRACT

A rubber material is molded into an enclosure of ungulate shape for engaging about and under a horse's hoof. The upper perimeter of the enclosure defines a rim, there being provided a generally horizontally forwardly extending lip across the rear portion of this rim. A flexible belt of textile material is arranged to pass through appropriate openings about the exterior of the enclosure immediately below the rim, the forward end portions of the belt being drawn together by a buckle to circumferentially contract the enclosure about the horse's hoof. The rear horizontally extending lip engages over the heel of the hoof to assure that the enclosure will stay in position.

5 Claims, 5 Drawing Figures

NAIL-LESS HORSESHOE

This invention relates generally to horseshoes and more particularly to a nail-less horseshoe in the form of an enclosure for completely surrounding a horse's hoof.

BACKGROUND OF THE INVENTION

In U.S. Pat. No. 3,794,119 issued Feb. 26, 1974 in which I am a co-inventor there is described a horseshoe essentially designed to engage about and under a horse's hoof, there being provided a separate sling arrangement to be secured about the rear portion of the horseshoe to hold it in place on the horse's hoof. The advantages to be derived from such an arrangement are fully set forth in this patent. Chief among these advantages is the absence of any type of nails which oftentime cause injury to a horse's hoof or can cause infection.

In spite of a fair degree of success with the horseshoe described in the above-mentioned patent, there are still some problems resulting directly from the particular structure involved. First, there is a certain difficulty involved in placing the horseshoe on the hoof of a horse in that some stretching of the top lip or peripheral portion of the opening of the horseshoe is necessary. While an integral tongue structure has been provided on the rear to aid in applying the horseshoe, considerable time is necessary to properly fit the horseshoe on the horse's hoof. Further, the sling structure described while serving to hold the shoe to the horse's hoof can, after extended use, tend to work loose so that a sloppiness in the shoe results. There is also somewhat of a disadvantage in providing a separate sling which must be attached each time the horseshoe is applied in that the sling itself when not in use can become separated from the remaining portion of the shoe and if either one or the other of these components is lost, the remaining component is essentially useless.

Since issuance of the above-identified patent, I have conducted further extensive experiments in an attempt to provide improvements, particularly directed towards overcoming some of the above problems. In one instance, I proposed the use of a non-extensible metal strap in place of the sling to assure that the shoe would be secured onto a horse's hoof. The problem with an non-extensible strap is that the "size" of the horse's hoof can vary even though such variation is slight after prolonged use. As a consequence, the non-extensible strap circumferentially surrounding and contracted against the hoof can become continuously uncomfortable for the horse. On the other hand, if the strap is not sufficiently tight when the shoe is applied, the shoe can oftentimes be kicked off by the horse, particularly when galloping.

BRIEF DESCRIPTION OF THE PRESENT INVENTION

Bearing all the foregoing considerations in mind, the present invention represents the culmination of all of my experiments with nail-less horseshoes and essentially overcomes the problems set forth above.

More particularly, the nail-less horseshoe comprises a flexible material defining an enclosure having an upper rim the enclosure being of generally hollow ungulate shape for engaging about and under a horse's hoof. A generally horizontal forwardly directed rear lip extends across the rear upper perimeter portion of the rim. In addition, a front V-shaped opening extends from the upper front of the rim of the enclosure and terminates in a vertex portion at the lower front of the enclosure to permit the enclosure to be expanded and placed over the hoof of the horse. Rather than a non-extensible metal strip or sling, I utilize a flexible belt of textile material capable of some stretching. Nylon is an example of such a material. This flexible belt is arranged to pass through slot openings formed in the exterior of the enclosure, the opposite end portions of the belt extending forwardly adjacent to the V-shaped opening. A buckle means is coupled to the opposite end portions of the belt for cinching the end portions together in overlapping relationship so that the enclosure may readily be disposed over a horse's hoof and thereafter circumferentially contracted to fit the hoof in a comfortable manner. The referred to rear horizontally extending lip engages over the rear heel portion of the horse's hoof and will prevent inadvertent kicking off of the horseshoe. Moreover, the fact that some stretching of the belt material can take place results in an accommodation of the snugness of the shoe to changes in the size of the hoof so that the shoe is at all times comfortable for the horse.

BRIEF DESCRIPTION OF THE DRAWINGS

A better understanding of my improved nail-less horseshoe will be had by now referring to the preferred embodiment thereof as illustrated in the accompanying drawings in which.

DETAILED DESCRIPTION OF THE PREFERRED EMBODIMENT

Figure 1:
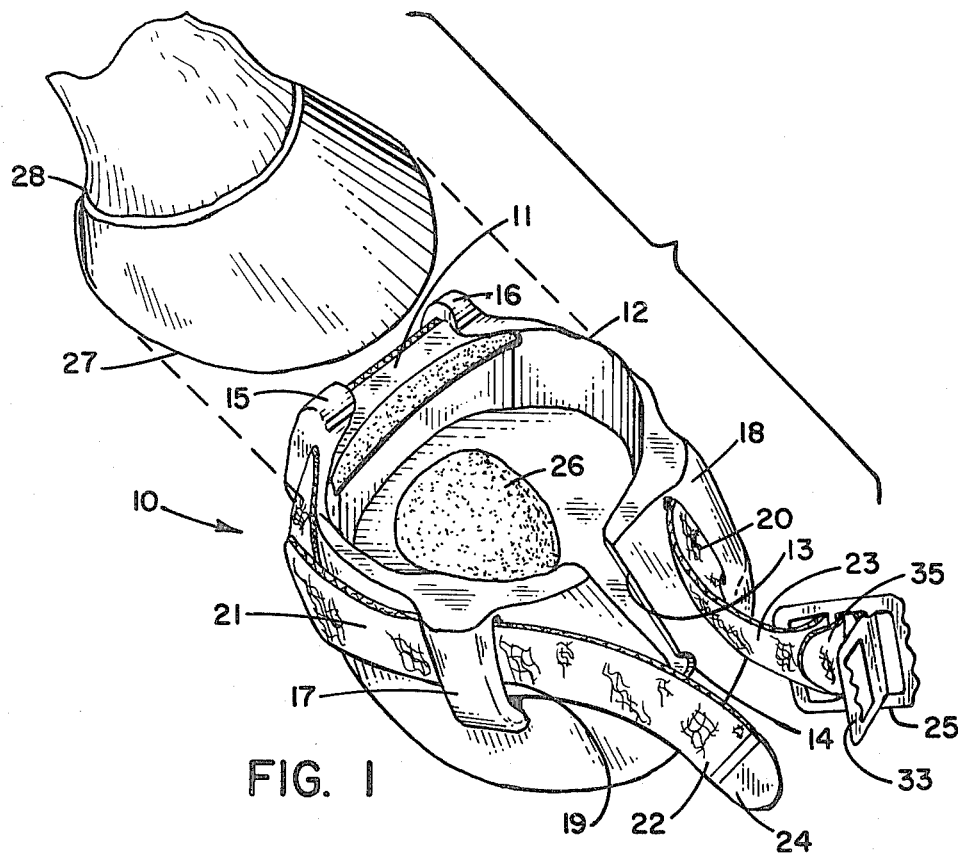
FIG. 1 is a perspective view of the nail-less horseshoe preparatory to receiving a horse's hoof, a fragmentary portion of which is shown exploded away from the shoe.

Referring first to FIG. 1, the nail-less horseshoe is designated generally by the numeral 10 and comprises a flexible material defining an enclosure of general hollow, ungulate shape. A generally horizontally forwardly directed rear lip 11 extends across the rear upper perimeter portion of the enclosure rim 12. A front V-shaped opening 13 in turn extends from the upper front of the rim 12 of the enclosure and terminates in a vertex formed into a small circle 14 to avoid tearing. This V-shaped arrangement permits the enclosure to be expanded.

Enclosure 10 further includes integrally formed exterior enlargements such as indicated at 15, 16, 17 and 18, each of these enlargements having generally vertical slots such as indicated at 19 for the enlargement 17 and at 20 for the enlargement 18. The enlargements are positioned at circumferentially spaced exterior locations about the enclosure 10 adjacent to the rim 12 as illustrated.

The horseshoe is completed by the provision of a flexible belt 21 of textile-like material passing about the exterior of the enclosure through the slots such as slots 19 and 20 below the rim 12. Opposite forward end portions 22 and 23 extend forwardly adjacent to the V-shaped opening 13. The extreme end of the portion 22 of the belt terminates in a stiff part 24 for easy reception in an appropriate buckle means 25 coupled to the other end portion 23.

In addition to the structure described in FIG. 1, there may be provided a pad 26 in the central floor portion of the enclosure 10 for cushioning the frog area of a horse's hoof as will become more apparent as the description proceeds.

With the enclosure 10 in the condition illustrated in FIG. 1, the V-shaped opening 13 may be expanded and the nail-less horseshoe enclosure inserted over a horse's hoof shown at 27 preparatory to receiving the horseshoe. The end portion 22 of the belt can then be threaded through the buckle 25 with the end portions 22 and 23 overlapping. The end portions are then cinched to increase the overlap, the degree of tightness being maintained by the buckle. However, the "textile material" of the belt is such that some stretching can take place. In this respect, nylon is a preferred material for forming the belts since it provides some stretch and yet will tend to return to its original dimensions. With the enclosure circumferentially contracted about the hoof 17, the rear lip 11 will engage over the rear heel portion 28 of the horse's hoof and constitutes an important feature of this invention in that it retains the horseshoe on the horse's hoof.

Figure 2:
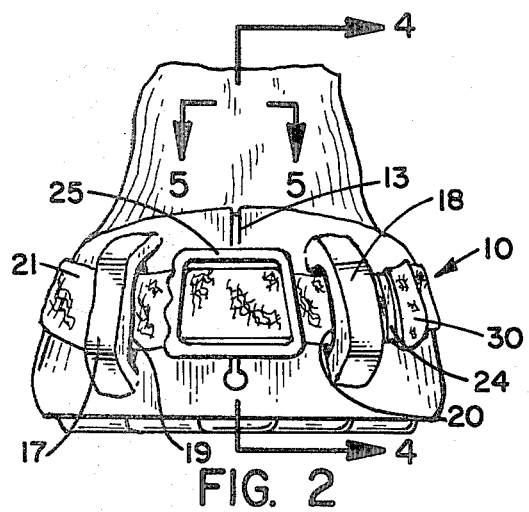
FIG. 2 is a front elevational view of the horseshoe after the horse's hoof has been inserted and the shoe properly secured to the hoof.

FIG. 2 shows in front elevation the end portions of the belt properly cinched up by the buckle 25 so that the shoe snugly engages the horse's hoof. A further belt retaining tab 30 may be provided if desired to hold flat the extreme end portion 24 of the belt 21 as shown in FIG. 2.

Figure 3:
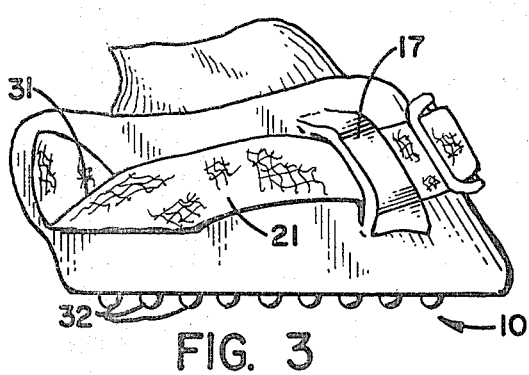
FIG. 3 is a side elevational view of the hoof and shoe illustrated in FIG. 2.

FIG. 3 illustrates in side elevation the appearance of the horseshoe when snugly engaging the horse's hoof. It will be noted that the belt 21 is folded as indicated at 31 a similar fold being provided on the opposite rear side portion of the enclosure. This folding of the belt enables essentially full surface contact of the belt over its width around the entire exterior portion of the enclosure. In this respect, it can be appreciated that the ungulate shape is wider at the bottom than at the upper rim portion resulting in sloping side walls. By providing two folds such as indicated at 31 in the belt, the belt can lie flat against these inclined walls and thus exert relatively even pressure about the entire circumference of the enclosure.

Figure 4:
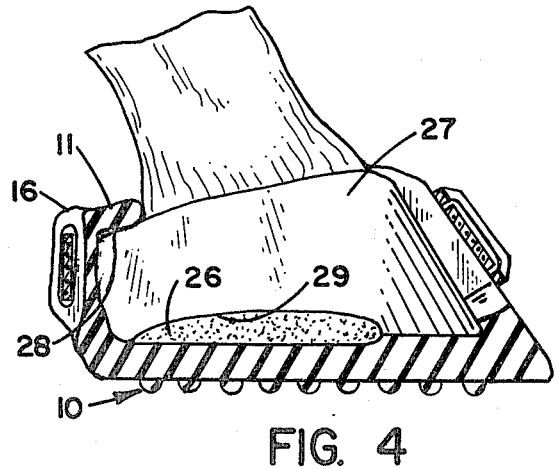
FIG. 4 is a cross section showing a portion of the hoof in full lines, looking generally in the direction of the arrows 4—4 of FIG. 2.

FIG. 4 illustrates the pad 26 engaging the frog area 29 of the horse's hoof 27. Also, the manner in which the rear lip 11 engages over the heel 28 of the hoof is clearly shown, this feature, as stated, inhibiting the horse kicking off the shoe when galloping. In this latter respect, it can be appreciated that there is a tendency for the rear portion of the enclosure to move downwardly away from the heel of the horse's hoof when the horse is running as a result of the toe or forward portion of the hoof engaging the ground first. The lip 11 prevents downward sliding movement of the rear portion of the enclosure.

As shown in both FIGS. 3 and 4, the material forming the bottom exterior of the enclosure is preferably formed with transverse ribs 32 to provide traction for the horseshoe.

Figure 5:
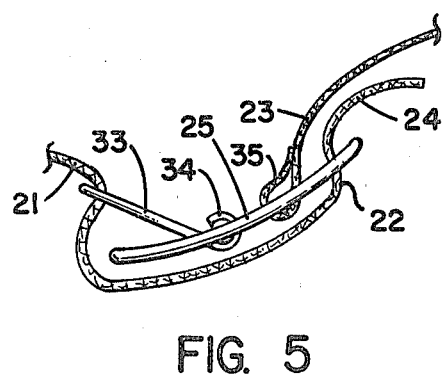
FIG. 5 is a fragmentary top plan view of a buckle means portion looking in the direction of the arrows 5—5 of FIG. 2 but showing belt portions in loosely arranged fashion for purposes of explanation of the operation of the buckle.

Referring now to FIG. 5, the manner in which the end portions 22 and 23 can be cinched into overlapping relationship by the belt buckle 25 will be clear. The buckle 25 itself includes a secondary buckle portion 33 hinged at 34 to the main buckle portion intermediate its ends. This secondary hinged buckle 33 is more clearly illustrated in FIG. 1. As also illustrated in both FIGS. 1 and 5, the end portion 23 of the belt is secured to the buckle 25 as at 35.

In threading the belt to cinch the belt ends into a desired overlapped relationship, the end portion 22 of the belt 21 is first passed through the secondary buckle portion 33 thence around the left end of the buckle as viewed in FIG. 5 and then under the right end of the buckle. Pulling on the end 24 with the secondary buckle 33 spaced away from the left end of the buckle part 25 permits the desired overlap adjustment to be made. After this adjustment, the forces tending to pull the end portions apart result in the secondary buckle 33 lying almost parallel to the left portion of the buckle 25 thus locking the belt. In fact, the greater the pulling force, the greater will be the locking action occurring as a result of the swinging of the secondary buckle 33 more tightly against the left end of the buckle portion 25. However, as mentioned, where a stretchable textile material is used such as nylon, some "give" results so that the horseshoe will not be uncomfortably tight on the horse's hoof.

The preferred material of the nail-less horseshoe comprises rubber molded into the desired ungulate shape to define the enclosure.

From all of the foregoing, it will be evident that the present invention has provided a greatly improved nail-less horseshoe wherein the various problems associated with prior art structures are avoided.

I claim:

1. A nail-less horseshoe comprising, in combination:
   (a) a flexible material defining an enclosure having an upper rim, said enclosure being of general hollow ungulate shape for engaging about and under a horse's hoof and including a generally horizontal forwardly directed rear lip across the rear upper perimeter portion of said rim and a front V-shaped opening extending from the upper front of said rim of the enclosure and terminating in a vertex portion at the lower front of the enclosure to permit the enclosure to be expanded and placed over the hoof, said enclosure including integrally formed exterior enlargements having generally vertical slots, said enlargements being positioned at circumferentially spaced exterior locations about the enclosure;
   (b) a flexible belt of textile material passing about the exterior of the enclosure below said rim through said slots with opposite end portions of the belt extending forwardly adjacent to said V-shaped opening; and
   (c) buckle means coupled to said opposite end portions of said belt for cinching the end portions together in overlapping relationship whereby said enclosure may be readily disposed over a horse's hoof and thereafter said end portions of the opposite ends of said belt cinched to circumferentially contract the enclosure about the hoof, said rear lip engaging over the rear heel portion of the horse's hoof, the opposite sides of said V-shaped opening coming together as said enclosure is contracted to thereby cause said enclosure to snugly engage the horse's hoof.

2. A nail-less horseshoe according to claim 1, in which said flexible belt of textile material is twice folded at rear side portions of said enclosure so that the belt can effect essentially full surface contact over its width circumferentially around the entire enclosure to thereby essentially lock the enclosure to the horse's hoof.

3. A nail-less horseshoe according to claim 1, including a pad in the interior floor of said enclosure to cushion the frog area of the horse's hoof.

4. A nail-less horseshoe according to claim 1, in which the material forming the bottom exterior of said enclosure has transverse ribs to provide traction for the horseshoe.

5. A nail-less horseshoe according to claim 1, in which the material of said enclosure comprises rubber molded into said ungulate shape to define said enclosure.

* * * * *